(12) United States Patent
Ahn et al.

(10) Patent No.: US 11,101,482 B2
(45) Date of Patent: Aug. 24, 2021

(54) SOLID OXIDE FUEL CELL CATALYTIC CONVERTER

(71) Applicants: Jeongmin Ahn, Manlius, NY (US); Thomas Welles, Syracuse, NY (US)

(72) Inventors: Jeongmin Ahn, Manlius, NY (US); Thomas Welles, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 108 days.

(21) Appl. No.: 16/261,875

(22) Filed: Jan. 30, 2019

(65) Prior Publication Data

US 2020/0052316 A1 Feb. 13, 2020

Related U.S. Application Data

(60) Provisional application No. 62/715,405, filed on Aug. 7, 2018, provisional application No. 62/624,358, filed on Jan. 31, 2018.

(51) Int. Cl.

| | |
|---|---|
| *H01M 8/06* | (2016.01) |
| *H01M 8/1233* | (2016.01) |
| *H01M 8/04828* | (2016.01) |
| *H01M 8/04701* | (2016.01) |
| *H01M 8/1231* | (2016.01) |

(52) U.S. Cl.
CPC ....... *H01M 8/1233* (2013.01); *H01M 8/0494* (2013.01); *H01M 8/04701* (2013.01); *H01M 8/1231* (2016.02)

(58) Field of Classification Search
CPC ............. H01M 8/1233; H01M 8/0494; H01M 8/04701; H01M 8/1231; H01M 8/2484; H01M 8/04708; H01M 8/04007; H01M 8/0606; H01M 2250/20; H01M 8/243; Y02E 60/50; Y02T 90/40

See application file for complete search history.

(56) References Cited

U.S. PATENT DOCUMENTS

| | | | |
|---|---|---|---|
| 2002/0142200 A1* | 10/2002 | Formanski | H01M 8/04 429/17 |
| 2004/0177607 A1* | 9/2004 | Suzuki | F01N 3/00 60/286 |
| 2007/0037024 A1* | 2/2007 | Buglass | H01M 8/0612 429/425 |

(Continued)

*Primary Examiner* — Raymond Alejandro
(74) *Attorney, Agent, or Firm* — Bond Schoeneck and King PLLC; David Nocilly

(57) ABSTRACT

A dual chamber solid oxide fuel cell integrated into the exhaust stream of an internal combustion engine, in which engine exhaust gases are routed to the anode of a tubular solid oxide fuel cell (SOFC) and heated secondary air is supplied to the cathode of the SOFC. The secondary air supply is heated using the existing engine temperature and exhaust gas temperature through a heat exchanger formed by a modified cylinder head and exhaust manifold. The dual chamber solid oxide fuel provides the necessary hydrocarbon and carbon monoxide scrubbing to achieve mandatory catalytic conversion for vehicle operation. In addition, the dual chamber solid oxide fuel cell is capable of generating sufficient electrical power for the vehicle. Omission of conventional catalytic convertors and alternators allows for improved efficiency and fuel economy of the internal combustion engine.

12 Claims, 7 Drawing Sheets

(56) References Cited

U.S. PATENT DOCUMENTS

2010/0086824 A1* 4/2010 Homel ..................... C25B 1/04
   429/406
2010/0330450 A1* 12/2010 Huang ................. H01M 8/243
   429/480
2015/0004528 A1* 1/2015 Palumbo ............ H01M 8/0273
   429/508

* cited by examiner

SOLID OXIDE FUEL CELL CATALYTIC CONVERTER

CROSS-REFERENCE TO RELATED APPLICATIONS

The present application claims priority to U.S. Provisional No. 62/624,358, filed on Jan. 31, 2018 and U.S. Provisional No. 62/715,405, filed on Aug. 7, 2018.

BACKGROUND OF THE INVENTION

1. Field of the Invention

The present invention relates to vehicle catalytic convertors and, more particularly, to a solid oxide fuel cell for catalytic conversion and electrical energy generation.

2. Description of the Related Art

Currently the automotive industry is faced with producing the most efficient vehicles with the lowest environmental emissions possible. The advent of hybrid systems are growing, yet are not fully infiltrating the market. As a result, automobile manufacturers are still focusing on pure gasoline or fossil fuel powered vehicles that produce various emissions that are harmful to the environment.

In order to reduce emissions, most internal combustion engines rely on the use of a catalytic converter to modify exhaust gases. Catalytic convertors are usually in the form of a honeycomb structure or coated beads and use palladium, platinum, and other precious metals as a catalyst to reduce harmful emissions in the exhaust by reducing the concentration of hydrocarbons and carbon monoxide as well as other lesser exhaust gas constituents. A secondary air injection system is used to introduce fresh air into the exhaust stream to aid in the catalytic reaction.

Catalytic converters are undesirable, however, as they restrict the flow of exhaust gas, thereby reducing the efficiency of the engine. Catalytic converters also cannot be allowed to get too hot or they are at risk of thermal degradation, melting and collapse. Therefore, many restrictions are placed on auto-manufacturers to ensure the proper function of catalytic converters. For example, thermal insulation of exhaust headers has been suggested for increased thermal efficiency. However, this greatly increases the temperature of the exhaust gas reaching the catalytic converter and may still cause thermal degradation.

At the same time, the charging system used for the electrical components of the vehicle has not changed considerably since the creation of the automobile industry. Vehicles rely on an alternator that is driven by the crank shaft of the engine to convert the mechanical energy of the engine into electricity. Alternators are heavy and require a large amount of space within the engine bay. The alternator is constantly being driven while the engine is running; and therefore, alternators are a significant source of engine efficiency loss. Even with new developments of alternator drive pulley's and bearings, alternators still reduce the efficiency of the overall engine.

Accordingly, there is a need in the art for an exhaust reformation system that can also produce the electricity needed by a vehicle, thereby reducing engine emissions while obviating the need for an alternator.

BRIEF SUMMARY OF THE INVENTION

The present invention comprises the use of a dual chamber solid oxide fuel cell integrated into the exhaust stream of an internal combustion engine. The dual chamber solid oxide fuel cell can provide the necessary hydrocarbon and carbon monoxide scrubbing while generating sufficient electrical power for the vehicle. The catalytic converter and alternator may then be omitted, increasing the overall efficiency and fuel economy of the internal combustion engine. More specifically, the solid oxide fuel cell is positioned immediately downstream of the engine exhaust and includes a source of secondary air that is heated and either premixed with the engine exhaust or delivered separately to the solid oxide fuel cell. The fuel cell reforms the exhaust gases and produced electrical energy for use elsewhere in the vehicle.

In one embodiment, the present invention is an apparatus for reducing engine emissions that has a stack of fuel cells defining a first chamber, wherein each fuel cell comprises a tube having an anode positioned on an inside the tube and a cathode positioned on an outside the tube. A first port is coupled to the first chamber for delivering a quantity of engine exhaust to the inside of the tubes. A second chamber encloses the outside of each of the tubes and coupled to inside of the tubes for receiving the engine exhaust after it has passed through the insides of the tubes and for allowing the engine exhaust to contact the cathodes of the tubes. A second port is coupled to the second chamber for delivering a quantity of fresh air to the cathodes of the tubes. An exhaust is coupled to the second chamber for exhausting the engine exhaust after it has contacted the cathodes of the tubes. The manifold is coupled to the first port and the second port. The manifold may have a first portion in communication with the first port and configured to collect engine exhaust from an engine and a second portion coupled to the second port and configured to receive fresh air. The first portion and the second portion of the manifold are positioned proximately to each other such that any fresh air passing through the second portion will be warmed by any exhaust gas in the second portion. The manifold may be configured to be coupled to an engine block. The manifold may be configured as a single block having passages formed therethrough to define the first portion and the second portion.

In another embodiment, the present invention may be a method of reducing engine emissions involving the steps of providing a first chamber defined by a stack of fuel cells, each of which comprises a tube having an anode positioned on an inside the tube and a cathode positioned on an outside the tube, passing a quantity of engine exhaust through the inside of the tubes so that the engine exhaust contacts the anodes of the tubes, collecting the engine exhaust from the inside of the tubes and passing the engine exhaust over the outside of the tubes in a second chamber so that the engine exhaust contacts the cathodes of the tubes, delivering a quantity of fresh air to the second chamber, and exhausting the engine exhaust from the second chamber after the engine exhaust has contacted the cathodes.

In an additional embodiment, the present invention may be an apparatus for reducing engine emissions having a stack of fuel cells defining a first chamber, wherein each fuel cell comprises a tube having an anode positioned on an inside the tube and a cathode positioned on an outside the tube, a first port coupled to the first chamber for delivering a quantity of engine exhaust and a quantity of fresh air to the inside of the tubes, a second chamber enclosing the outside of each of the tubes and coupled to inside of the tubes for receiving the engine exhaust after it has passed through the insides of the tubes and for allowing the engine exhaust to contact the cathodes of the tubes, and an exhaust coupled to the second chamber for exhausting the engine exhaust after it has contacted the cathodes of the tubes.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
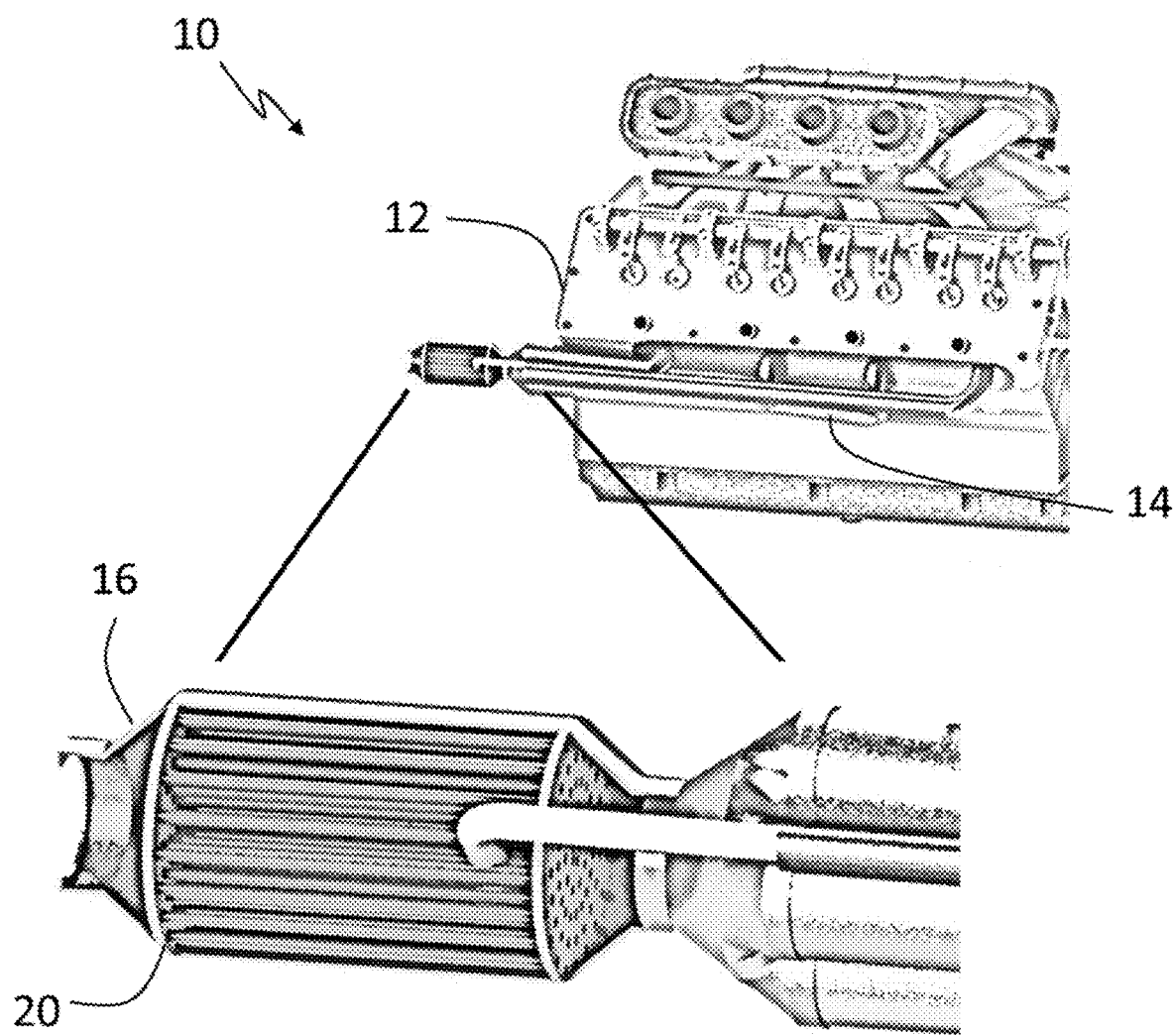
FIG. 1 is a perspective view of an embodiment of a solid oxide fuel cell that can replace the catalytic converter and alternator of an internal combustion vehicle according to the present invention.
Figure 7:
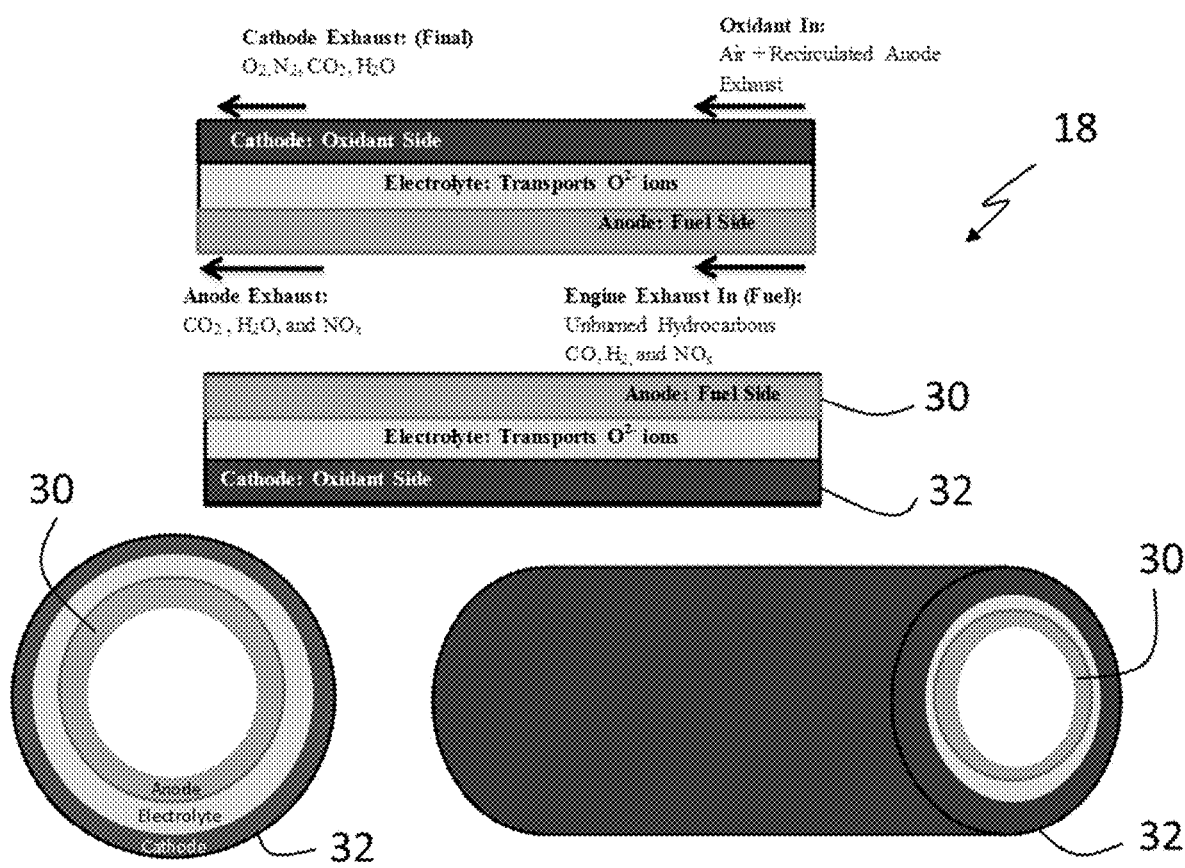
FIG. 7 is a schematic of tubular fuel cells according to the present invention.

Referring to the figures, wherein like numeral refer to like parts throughout, there is seen in FIG. 1 an internal combustion engine system 10, including an internal combustion engine 12 with exhaust manifold 14 and a dual chamber solid oxide tubular fuel cell stack (SOFC) 16 positioned downstream of the exhaust manifold 14 and configured within a catalytic convertor canister 20. Fuel cell stack 16 is placed just downstream of exhaust manifold 14 of engine 12 for reformation of engine exhaust and includes a plurality of fuel cells formed as tubes 18 with the anode layer on the inside and the cathode in the outside. The arrangement of tubes 18 to form fuel cells is detailed in FIG. 7.

Figure 2:
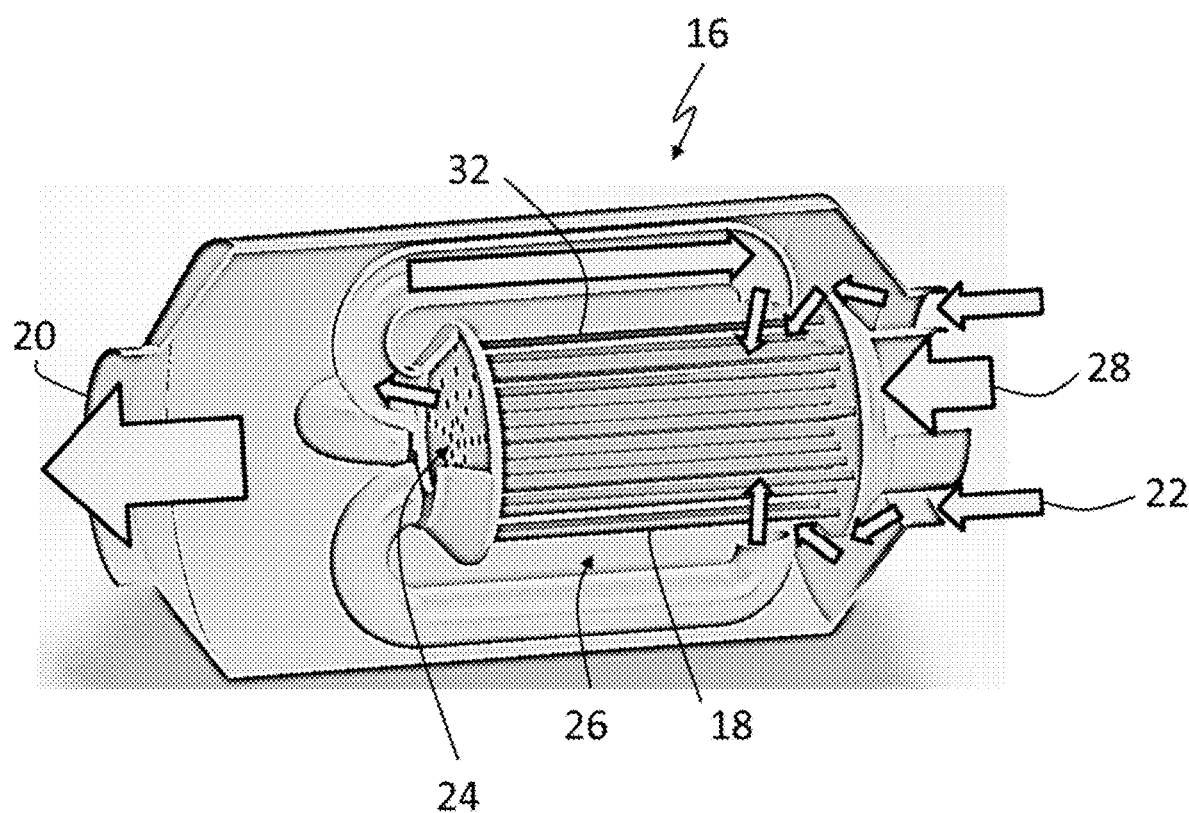
FIG. 2 is a partial cutaway of an embodiment of a solid oxide fuel cell that can replace the catalytic converter and alternator of an internal combustion vehicle according to the present invention.

Referring to FIG. 2, dual chamber solid oxide tubular fuel cell stack 16 includes first chamber 24 formed by headers on either end of the tubes of fuel cell stack 16 and including the inner space within the tubes 18 for contact with the anodes 30 of fuel cell stack 16. Chamber 24 receives the engine exhaust from a main port 28 and directs the exhaust over the anodes 30 within the tubes of fuel cell stack 16. After passing through tubes of fuel cell stack 16, the exhaust from chamber 24 is recirculated to the outside of the tubes to contact the cathodes 32 of fuel cell stack 16 in a second chamber 26. A secondary port 22 of canister 20 allows for delivery of fresh air to the second chamber 26 of fuel cell stack. Fresh air and exhaust gases are thus provided to fuel cell stack 16 with the exhaust gases flowing through tubular anodes 30 of fuel cell stack 16 and with the fresh air provided to the cathodes 32 on the outer surface of tubes 18 of fuel cell stack 16 in combination with the exhaust gases after passing through tubes 18. The fresh air supply is preferable positioned proximately to exhaust manifold 14 so that the hot engine exhaust in exhaust manifold will warm the fresh air for improved reaction with cathodes 32 of fuel cell stack 16. Engine exhaust is expelled through an exhaust 20 in communication with second chamber 26 and is configured to be coupled to the remaining portion of conventional automobile exhaust system, such as the exhaust pipe and muffler.

This arrangement provides a highly efficient, dual chambered design for fuel cell stack 16 that can deliver larger power outputs. Electrical power may be carried away from fuel cell stack 16 using conventional fuel cell circuitry to provide electrical energy to the vehicle and/or charge the battery of the vehicle. As described below, the use of the additional heat contained within the exhaust as it exits exhaust manifold 14 may provide the thermal energy needed for high SOFC performance.

Figure 3:
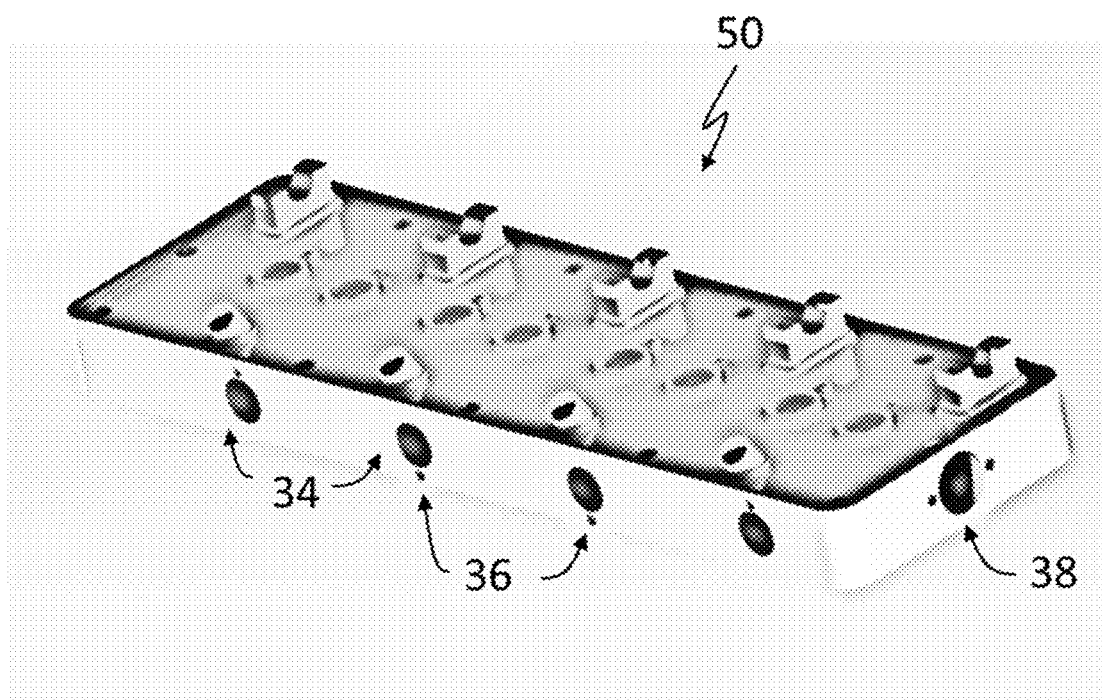
FIG. 3 is a perspective view of part of a cylinder head for use with a solid oxide fuel cell that can replace the catalytic converter and alternator of an internal combustion vehicle according to the present invention.

Referring to FIG. 3, the secondary air supply is achieved by rerouting the conventional secondary air supply of a cylinder head 50 of engine 12 so that it remains separate from the exhaust gas but positioned alongside for preheating. This may be accomplished by including secondary air ports 36 in the cylinder head alongside conventional exhaust ports 34 for the transfer of heat to the secondary air to ensure that the exhaust gas and fresh air remain separate. Thus, the secondary air system is routed along the cylinder head of engine 12 from a secondary air inlet 38 to the secondary air ports 36 and remains separate from the exhaust gas. A secondary air pump (which may be the existing air pump of the vehicle or a dedicated air pump with increased power) may be used to supply a consistent stream of fresh air to fuel cell stack 16.

Figure 4:
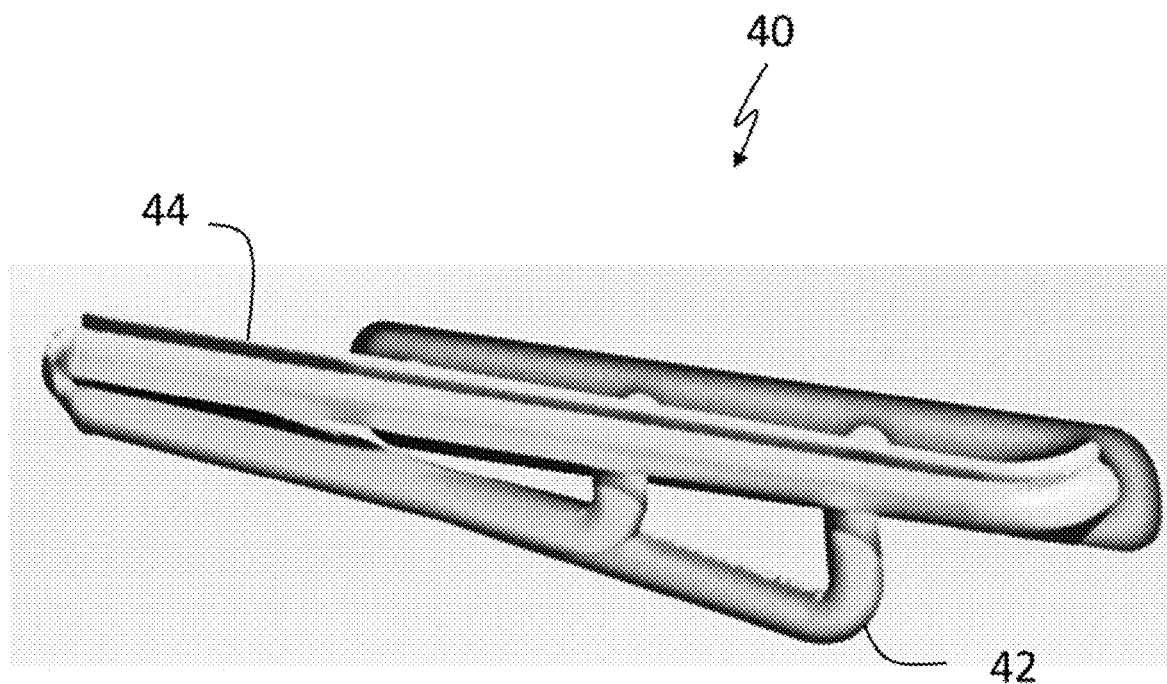
FIG. 4 is a perspective view of part of an exhaust manifold for use with a solid oxide fuel cell that can replace the catalytic converter and alternator of an internal combustion vehicle according to the present invention.

Referring to FIG. 4, a multi-port exhaust manifold 40 may be coupled to cylinder head 50 of FIG. 3 to transport the separated exhaust gas in a first portion 42 and fresh secondary air in a second portion 44 that extends from the secondary air ports 36 of cylinder head 50 to the main and secondary air ports of fuel cell stack 16, with the walls of the fresh air passages and the exhaust gas passages in contact with each other (or the same wall) to maintain and further the heating of the fresh air by the exhaust gas. The secondary port is thus positioned along exhaust manifold 14 to continue to heat the secondary air supply. As a result, the high temperature waste heat of engine 12 provides an ideal environment for improving the operation of fuel cell stack 16, with the cylinder head and exhaust manifold 14 acting as a heat exchanger to increase the temperature of the fresh secondary air. Exhaust manifold 14 may also be wrapped with thermal insulation or insulated in any other manner to help carry heat away from the engine and to fuel cell stack 16.

Figure 5:
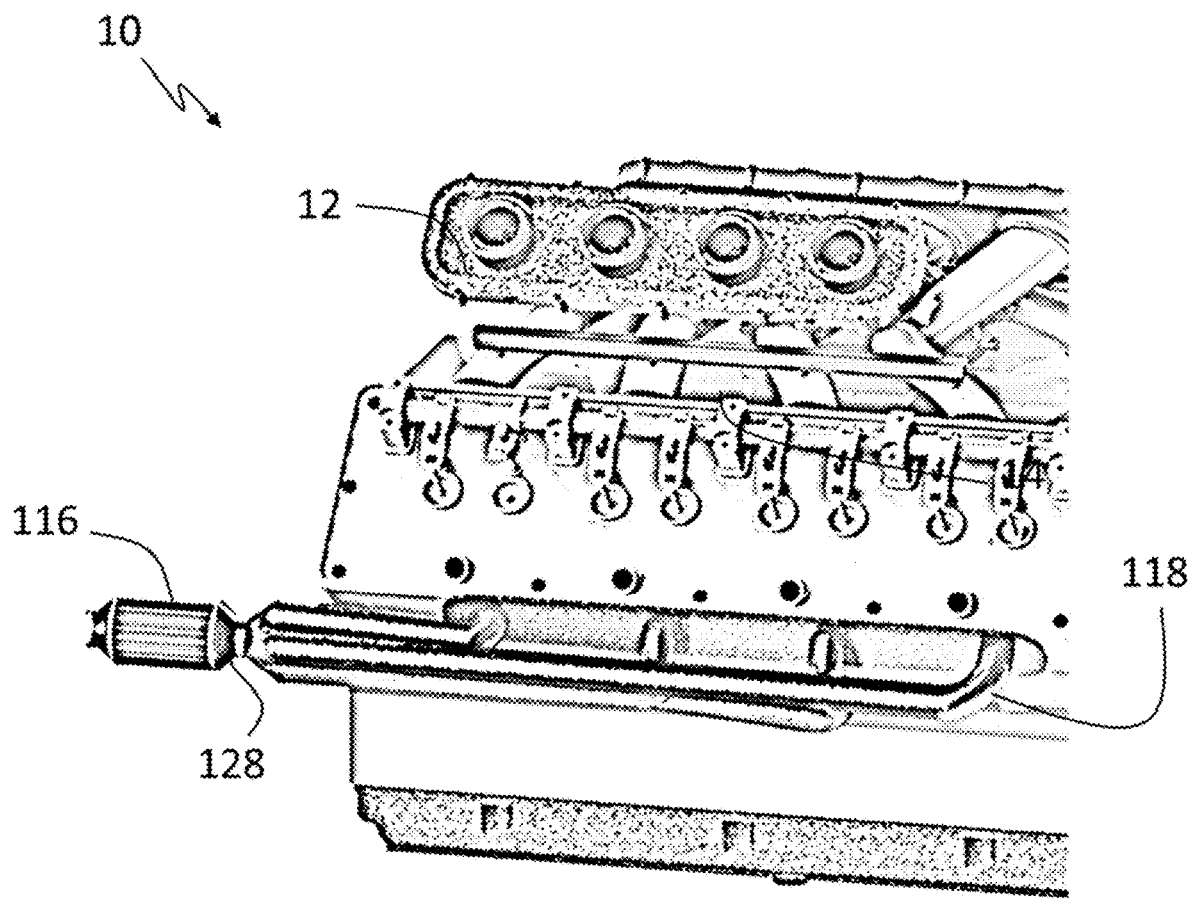
FIG. 5 is a perspective view of another embodiment of a solid oxide fuel cell that can replace the catalytic converter and alternator of an internal combustion vehicle according to the present invention.

As an alternative, there is seen in FIG. 5, a simplified design for the present invention that uses a single chamber solid oxide fuel cell 116. In this approach, solid oxide fuel cell 116 is positioned downstream of a conventional exhaust manifold 118 with just a single inlet 128 for exhaust gases and fresh air. No modification of exhaust manifold 118 from conventional manifolds is necessary as mixing of fresh secondary air with engine exhaust may be used by single chamber fuel cell 116. However, a secondary air pump may be needed to ensure a sufficient supply of fresh air to single chamber fuel cell 116. For single chamber fuel cell 116, a highly selective anode and cathode material must be used, which may reduce overall performance and possibly increase cost. While this approach is not favored, it would allow for easy retrofitting of existing vehicles as it does not require any modification of the engine components.

Figure 6:
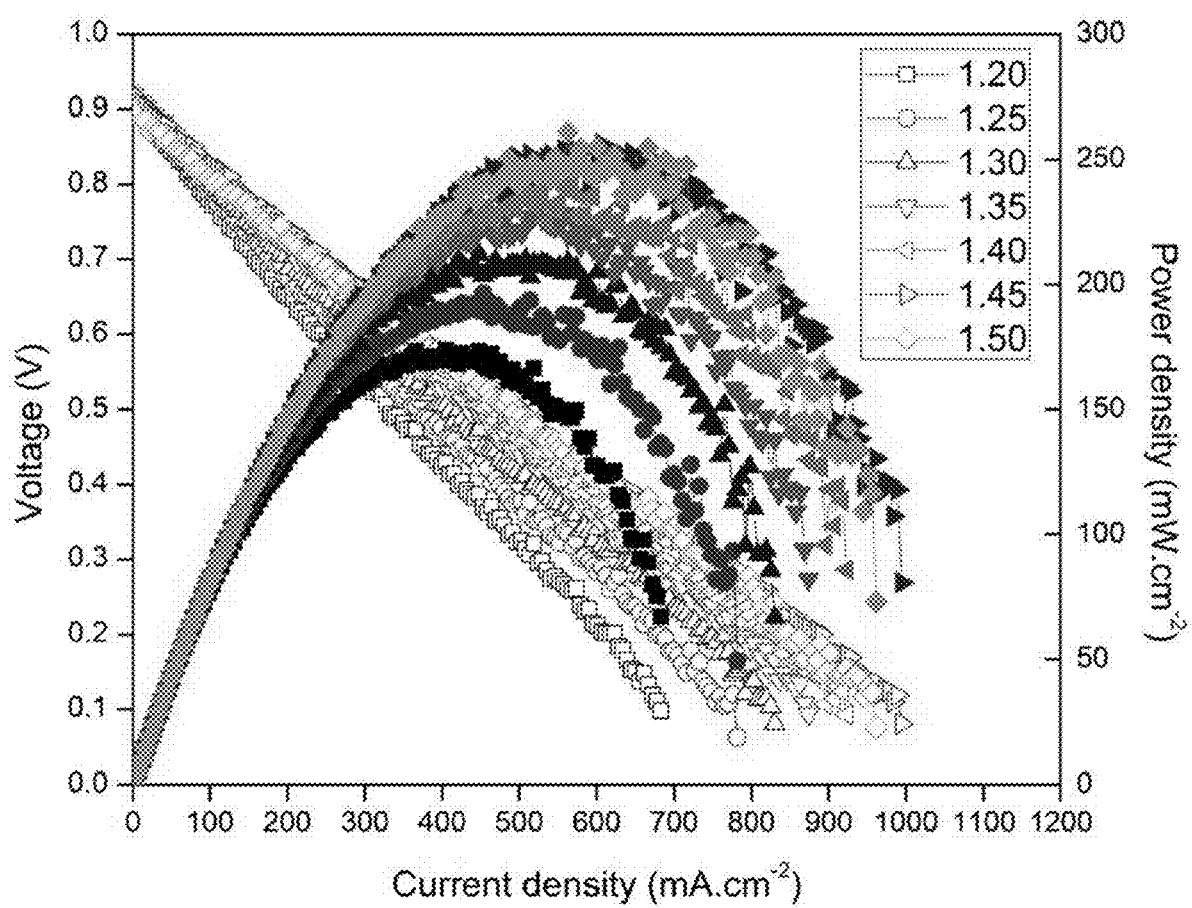
FIG. 6 is a power and polarization curve at different equivalence ratios (1.05-1.2) of methane combustion exhaust showing the performance of a solid oxide fuel cell that can replace the catalytic converter and alternator of an internal combustion vehicle according to the present invention.

As seen in FIG. 6, at equivalence ratios only slightly rich of stoichiometry (i.e. where there are few hydrocarbons and carbon monoxide in the exhaust) electrical power can be achieved by the present invention. Automobiles are tuned such that under load, the fuel trim in the vehicle already richens the fuel to air mixture. That is, under any load greater than level cruising, the automobile increases the amount of fuel relative to air being injected into the cylinder. This will allow the present invention to function in the exhaust stream without modifying the existing engine control units. The performance of the present invention may also be significantly improved by using fuel cell materials that are better suited to the particular operating temperatures of the vehicle.

The exhaust gas provided through the tubular anodes of the fuel cells thus acts as the primary fuel source for the SOFC. At the anodes of the fuel cells, any unburned hydrocarbons, $H_2$, and CO are reacted into water and carbon dioxide, while generating electrical energy. The exhaust gas, upon exiting the tubular anode of the SOFC, is recycled to the cathode side of the SOFC. The SOFC cathode layer is able to react NOx in lean conditions and will decompose NOx into $N_2$, allowing the oxygen ions to travel through the electrolyte layer to react with particulate carbon, CO, $H_2$, or hydrocarbons present on the anode layer. The exhaust gas then leaves the cathode side of the fuel cell stack and travels out of the tailpipe to the atmosphere.

The omission of the catalytic convertor will increase the thermal efficiency of the internal combustion engine, and thus increase fuel economy, as well as reducing engine emissions. In addition, the omission of an alternator as well as a catalytic convertor will reduce parasitic drag on the engine, eliminate the need for a conventional charging system, reduce the number of moving parts that can deteriorate and fail, and decrease the weight of the vehicle. These results are not achievable with a traditional catalytic system as a conventional catalytic converter cannot withstand the additional heat.

The present invention provides a highly efficient, dual-chambered design for the fuel cell stack in order to deliver larger power outputs. Electrical power may be carried away from the fuel cell stack to provide electrical energy to the vehicle. The present invention could be used immediately in the automotive industry and can significantly benefit internal combustion engine driven vehicles, as seen in the comparison of the present invention to a conventional system of Table 1 below.

TABLE 1

SOFC Comparison to Current Alternator System at Estimated Cruise of 65 mph

|  | Conventional Alternator System | SOFC System |
|---|---|---|
| Maximum Electrical Power Generated | 840 W | 840 W |
| Engine Crank Power Consumed | 1.964 kW | 0 |
| Fuel Required for Operation | 0.186 g/s | 0.048 g/s |
| Fuel Required for Engine to Develop 13 kW (Cruise Condition) | 1.227 g/s | 1.227 g/s |
| Total Fuel Required | 1.413 g/s | 1.275 g/s |
| Fuel Savings | — | 9.7% |

*Estimations done at hypothetical cruise of 2018 Chevrolet Malibu with a 1.5 L, 160 hp engine.
Cruise assumes a 20 hp load at 36 mpg. Assuming a 35% fuel to electrical conversion.

EXAMPLE

A model exhaust flow was created in a lab and included: Air, $CO_2$, $CH_4$, CO, and NO to mimic extremely lean exhaust conditions, such as those seen when the fuel supply to the engine is stopped but is still being rotated via the wheels, thereby causing air to be pumped through the engine. The flow composition was measured before and after each test without any emission reduction device, and then averaged to give a baseline flow. A piece of catalytic converter was used from a 2005 Volkswagen with the same surface area as the SOFC. The catalytic converter section was then tested against the new SOFC design. The equivalence ratio shown is the equivalence ratio of the model exhaust and does not indicate engine conditions.

TABLE 1

SOFC and Catalytic Converter Emission Reduction Comparison at 580° C.

|  | $O_2$ % | CO % | $CO_2$ % | NO ppm | $NO_2$ ppm | $C_xH_y$ ppm |
|---|---|---|---|---|---|---|
| Equivalence Ratio of 0.3 | | | | | | |
| Baseline | 8 | 2.2 | 22.9 | 46 | 0 | 6625 |
| Catalytic Converter | 7.57 | 1.36 | 23.6 | 39.17 | 1.83 | 6550 |
| SOFC | 7.11 | 0.59 | 24.6 | 34.5 | 0 | 6656 |
| Percent Difference | 5.62 | 35.2 | 4.73 | 10.1 | NA | −1.6 |
| Equivalence Ratio of 0.2 | | | | | | |
| Baseline | 11.3 | 3 | 22.1 | 125 | 0 | 3100 |
| Catalytic Converter | 10.9 | 2.79 | 23 | 122.8 | 0 | 3141 |
| SOFC | 6.15 | 2.44 | 26.1 | 72.25 | 3 | 2615 |
| Percent Difference | 42.3 | 11.6 | 14.1 | 11.6 | NA | 16.9 |

The final row for each equivalence ratio in Table 1, labeled "Percent Difference," gives the percentage difference between the SOFC performance and the catalytic converter. A positive number indicates a higher performance from the SOFC, whereas a negative number indicates a higher performance from the catalytic converter.

The new design for the SOFC system performs better than the catalytic converter. The SOFC significantly outperforms the catalytic converter in oxygen utilization, carbon dioxide production, as well as in the reduction of NO and CO reduction at an equivalence ratio of 0.3 and 0.2.

The SOFC closely matched (within 2%) the catalytic converter for hydrocarbon reduction at an equivalence ratio of 0.2. However, as the exhaust became leaner the SOFC significantly outperformed the catalytic converter in hydrocarbon reduction. Neither the SOFC nor the catalytic converter displayed consistent performance for $NO_2$.

Utilization of a SOFC in place of a traditional catalytic converter also has the potential for power generation while the engine is consuming fuel at stoichiometric or rich conditions. Initial testing indicates that an engine operating at stoichiometric conditions results in an exhaust of ~2-3% $H_2$ and CO and ~1% mixed hydrocarbons. These exhaust constituents may be used by the SOFC for electrical power generation. Direct utilization of the byproduct of the internal combustion engine for electrical power generation could result in higher overall efficiency for the automobile system by reducing the need for traditional charging systems.

The SOFC stack may be built within a cylindrical canister for ease of integration into current automotive exhaust systems. The canister can be approximately 6 inches in diameter by approximately 9 inches long so that it is of comparable size to the catalytic converter being replaced by the SOFC system of the present invention. The present invention is estimated to generate up to a 9.7% increase in fuel economy, leading to a reduction of 12 billion gallons of gasoline a year if adopted by the industry. That amounts to 1.74 Quads of hydrocarbon fuel saved each year; while saving drivers 9.7% of their yearly gasoline bill.

What is claimed is:

1. An apparatus for reducing engine emissions, comprising:
   a stack of fuel cells defining a first chamber, wherein each fuel cell comprises a tube having an anode positioned on an inside the tube and a cathode positioned on an outside the tube;
   a first port coupled to the first chamber for delivering a quantity of engine exhaust to the inside of the tubes;
   a second chamber enclosing the outside of each of the tubes and coupled to the inside of the tubes such that all of the quantity of engine exhaust that has passed through the insides of the tubes will contact the cathodes of the tubes;
   a second port coupled to the second chamber for delivering a quantity of fresh air to the cathodes of the tubes; and
   an exhaust coupled to the second chamber for exhausting the engine exhaust after it has contacted the cathodes of the tubes.

2. The apparatus of claim 1, further comprising a manifold coupled to the first port and the second port.

3. The apparatus of claim 2, wherein the manifold comprises a first portion in communication with the first port and configured to collect engine exhaust from an engine and a second portion coupled to the second port and configured to receive fresh air.

4. The apparatus of claim 3, wherein the first portion and the second portion are positioned proximately to each other such that any fresh air passing through the second portion will be warmed by any exhaust gas in the first portion.

5. The apparatus of claim 4, wherein the manifold is configured to be coupled to an engine block.

6. The apparatus of claim 5, wherein the manifold is configured as a single block having passages formed therethrough to define the first portion and the second portion.

7. A method of reducing engine emissions, comprising the steps of:
   providing a first chamber defined by a stack of fuel cells, each of which comprises a tube having an anode positioned on an inside the tube and a cathode positioned on an outside the tube;
   passing a quantity of engine exhaust through the inside of the tubes so that the engine exhaust contacts the anodes of the tubes;
   collecting the engine exhaust from the inside of the tubes and passing all of the quantity of the engine exhaust over the outside of the tubes in a second chamber so that the engine exhaust contacts the cathodes of the tubes;
   delivering a quantity of fresh air to the second chamber; and
   exhausting the engine exhaust from the second chamber after the engine exhaust has contacted the cathodes.

8. The method of claim 7, further comprising a manifold coupled to the first port and the second port.

9. The method of claim 8, wherein the manifold comprises a first portion in communication with the first port and configured to collect engine exhaust from an engine and a second portion coupled to the second port and configured to receive fresh air.

10. The method of claim 9, wherein the first portion and the second portion are positioned proximately to each other such that any fresh air passing through the second portion will be warmed by any exhaust gas in the first portion.

11. The method of claim 10, wherein the manifold is configured to be coupled to an engine block.

12. The method of claim 11, wherein the manifold is configured as a single block having passages formed therethrough to define the first portion and the second portion.

* * * * *